US006301522B1

(12) United States Patent
Salazar et al.

(10) Patent No.: US 6,301,522 B1
(45) Date of Patent: Oct. 9, 2001

(54) MOTION CONTROL METHODOLOGY FOR A HIGH-SPEED INSERTING MACHINE OR OTHER MAILING APPARATUS

(75) Inventors: Edilberto I. Salazar, Brookfield, CT (US); John W. Sussmeier, Cold Spring, NY (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/434,553

(22) Filed: Nov. 8, 1999

(51) Int. Cl.[7] ....... G06F 7/00

(52) U.S. Cl. ....... 700/213

(58) Field of Search ....... 700/213, 220, 700/227

(56) References Cited

U.S. PATENT DOCUMENTS

| | | | | |
|---|---|---|---|---|
| 4,449,196 | * | 5/1984 | Pritchard | 364/768 |
| 4,988,935 | * | 1/1991 | York | 318/568.18 |
| 5,521,627 | * | 5/1996 | Keung et al. | 347/220 |

* cited by examiner

*Primary Examiner*—Donald P. Walsh
*Assistant Examiner*—Khoi H. Tran
(74) *Attorney, Agent, or Firm*—Michael J. Cummings; Michael E. Melton

(57) ABSTRACT

A methodology for generating a motion profile for an axis of a motor in a mailing apparatus, the linear or angular motion of the motor axis imparting a motion to a sheet or envelope being conveyed by the mailing apparatus. The methodology includes four processes for generating a segment of a motion profile, depending on whether, for the segment, absolute positional synchronism (of the motor axis to be controlled relative to another motor axis) is needed, or whether a so-called quick step is needed, i.e. a change in velocity corresponding to acceleration that varies during the step. The processes include: forward integration, given the jerk (acceleration per unit time) and starting acceleration as well as initial values of position and velocity; non-parabolic displacement mapping (sometimes called electronic gearing) relating the motion of the axis to be controlled to the motion of another axis where the function expressing the mapping is not parabolic in the commanded or actual position of the other axis; integration based on a velocity equation that is parabolic in time; and a parabolic displacement mapping, i.e. a displacement mapping using a function that is parabolic in the actual or commanded position of a reference axis.

2 Claims, 9 Drawing Sheets

MOTION CONTROL METHODOLOGY FOR A HIGH-SPEED INSERTING MACHINE OR OTHER MAILING APPARATUS

FIELD OF THE INVENTION

The present invention pertains to the field of sheet feeding. More particularly, the present invention pertains to controlling the motion of sheets through a sheet handling device, such as a mailing machine, a postage meter, an envelope printer or inserter, and including a high-speed inserter.

BACKGROUND OF INVENTION

A typical sheet or envelope handling device includes various structures, motors and sensors. For example, a typical envelope handling device includes an envelope feeding structure for feeding an envelope or a batch of envelopes in singular fashion in a downstream path of travel to a work station. Typical envelope handling devices employ ejection rollers or ejection belts operating at a constant speed, or at some speed that varies as a function of time, speeds chosen so as to avoid envelope collisions and noise, and also to avoid so-called bounce-back from a wall when an envelope strikes a wall designed to stop its forward travel and cause it to drop onto the top of a stack. Depending on how the envelope moves through the device, more or less noise and bounce-back will result. It is beneficial to control to a fine degree the motion of a sheet or envelope handling device so as to keep noise and undesirable motion of the sheets or envelopes to a minimum.

The prior art uses motion profiles to express, as a function of time, the velocity/speed of an axis of a motor that causes motion of a sheet in a mailing system. A motion profile consists of a series of segments, each segment having a duration and each corresponding to a state of motion of an axis of a motor ultimately responsible for imparting motion to a sheet or envelope.

For example, a motor may have an axis that in rotating pulls a sheet through part of a mailing system at a certain speed, after accelerating at a specified acceleration as a function of time, and concluding with some specified deceleration as a function of time. If the sheet does not slip, then the motion of the sheet can be correlated precisely with the motion of the axis of the motor: the sheet moves through the mailing system with a speed that is exactly equal to the speed of rotation of the part of the axis in contact with the sheet, i.e. usually the surface of a belt driven by the axis. In this case, commands are sometimes sent to a motor to impart motion to a sheet, for a series of time segments, based simply on the assumption that the motion of the axis of the motor causing the motion of the sheet can be equated to the motion of the sheet.

On occasion, however, a sheet in a sheet handling device will slip so that the motion of the axis does not necessarily indicate the motion of a sheet (or envelope). Then the motion of an axis of a motor can be conditioned based on receiving commands from sensors used to detect the presence of the sheet as it moves through the sheet handling device.

Whether commands are sent based on a sheet not slipping, or based on information from sensors, the commands can be sent without regard to, i.e. independent of, the motion of the axis of any other motor. It is also possible, however, to send commands to a motor based on the motion of other motors.

The sending of commands to a motor based on the motion of (the axis) of another motor (which motion can be based on the motion of still a third motor, and so on), was in the past accomplished using mechanical gearing. Today, motors can be made to communicate electronically and use what is now sometimes referred to as electronic gearing, but also known as displacement mapping, in which the motion of the axis of one motor is expressed in terms depending only on the motion of the axis of another motor, whether or not there is slippage.

For either displacement mapping or sending commands without regard for the motion of any other motor, it is sometimes necessary to have the axis of a motor make a so-called quick step, involving first an acceleration and then a deceleration. Both of these transition segments are called quick steps, and involve sending commands to the axis of a motor so that the axis has a velocity that depends not only on time (i.e. time raised to the first power), but also on time raised to the second power, i.e. the velocity equation is parabolic.

What is needed is a methodology for providing motion profiles that express the required motion of axes of motors for causing a sheet to move through a mailing system in a desired way, a methodology that incorporates, for a given segment of the motion profile, a basis for specifying a particular kind of motion (the kind independent of the motion of other axes in the mailing system, and the kind that depend on the motion of other axes), and that sets out rules by which to construct each possible kind of segment.

SUMMARY OF THE INVENTION

Accordingly, the present invention provides a method for creating a motion profile used in controlling motion of an axis of a motor in a mailing machine, the motion profile expressing the motion of the axis in terms of a motion variable having a value depending on time, the motion profile consisting of a finite number of segments, the motion repeating after the motion prescribed in the finite number of segments is performed, the motion prescribed only at predetermined values of time separated by a loop closure period and measured from a starting time corresponding to a trigger event, the method calling for one of four methods of generating a segment of a profile, depending on whether, for the segment, either absolute positional synchronism with another axis, or a quick step (moving from one position to another by first accelerating and then decelerating) is needed. If absolute mechanical positional synchronism with respect to motion of another axis is not required and a quick step move is not needed, the method calls for determining position and velocity, for the segment, after each loop closure period by forward integrating over time from starting values of jerk, acceleration, velocity and position. If absolute mechanical positional synchronism with respect to another axis is required and a quick step move is not needed, the method calls for determining position after each loop closure period by performing a displacement mapping using as an input either the commanded or actual position of a reference axis, where the displacement mapping is a non-parabolic function of the commanded or actual position of the reference axis, i.e. does not involve the actual or commanded position of the reference axis to the second power. If a quick step is needed and absolute mechanical positional synchronism with respect to motion of another motor is not required, the method calls for determining position after each loop closure period based on a parabolic velocity equation, having as inputs a step time and a step value. Finally, if a quick step is needed and absolute mechanical positional synchronism with respect to motion of another motor is required, the method calls for determining position after each loop closure period by a displacement mapping using as an input either the commanded or actual position of a reference axis, where the displacement mapping is a parabolic function of the commanded or actual position of the reference axis.

BRIEF DESCRIPTION OF THE DRAWINGS

The above and other features and advantages of the invention will become apparent from a consideration of the subsequent detailed description presented in connection with accompanying drawings, in which.

DETAILED DESCRIPTION OF A PREFERRED EMBODIMENT

The present invention will be described after first describing a mailing apparatus, namely a thermal postage meter, for which the methodology of the present invention could be used to generate motion profiles. The illustration afforded by the reference to a thermal postage meter is to be understood as simply one kind of application which the methodology of the present invention could be applied to determine the motion profile. The methodology of the present invention is intended for any kind of mailing apparatus, and the advantage of applying the present methodology increases as the complexity of the mailing apparatus increases, so that its application to a high-speed inserting machine, for example, is especially beneficial.

Figure 1:
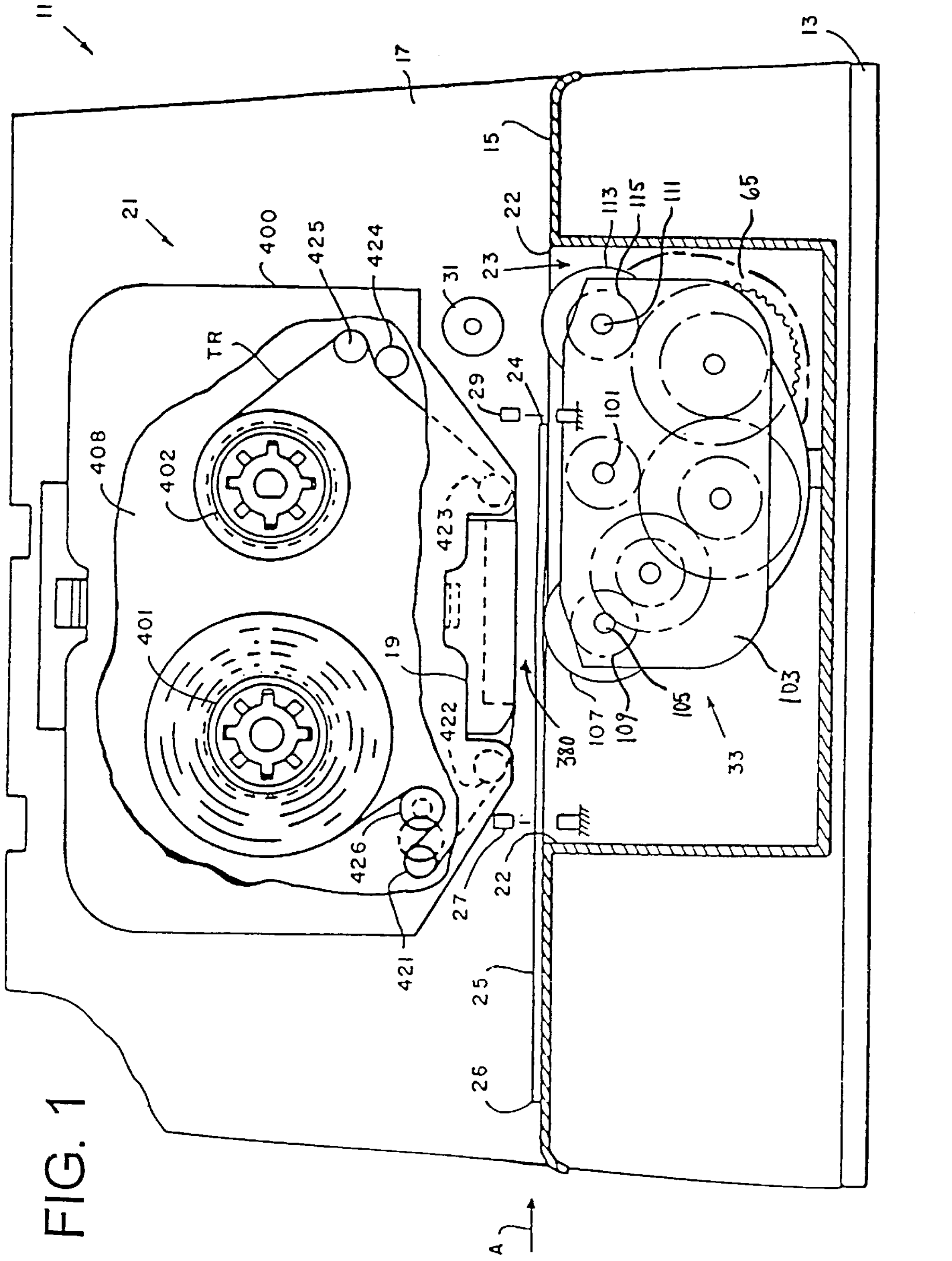
FIG. 1 is a partial cutaway and partial sectioned front view of a thermal postage meter with a ribbon cassette to which the methodology of the present invention can be applied.

Referring now to FIG. 1, a thermal postage meter 11 includes a base 13 and a substantially vertical registration wall 17. The registration wall 17 and the base 13 are rigid structures, each providing a suitable framework for mounting and supporting various other components. Fixably mounted to the registration wall 17 and to the base 13 is a substantially horizontal deck 15. A thermal print head 19, a trailing edge sensor 27 and a leading edge sensor 29 are fixably mounted to the registration wall 17.

Detachably mounted to the registration wall 17 is a thermal ribbon cassette 21 containing a supply of thermal ribbon TR which has a backing layer and an ink coating layer. The thermal ribbon TR is unwound from a supply reel 401 and feeds along a defined path such that the backing layer comes into contact with the thermal print head 19 before being collected on a take-up reel 402.

Rotatively mounted to the registration wall 17 is a backing roller 31. An envelope 25 having a leading edge 24 and a trailing edge 26 is shown positioned on the deck 15 and travels along a defined path from left to right as indicated by an arrow “A”. The deck 15 includes an opening 22 and deck recess 23, which are generally aligned underneath the thermal print head 19 and the backing roller 31.

A print and eject roller drive assembly 33 is generally located in the deck recess 23 such that a print roller 107 is opposite the thermal print head 19 and an eject roller 113 is opposite the backing roller 31. The axes of the print roller 107 and eject roller 113 are substantially parallel and transverse to the direction of envelope travel “A”. The deck recess 23 is sufficiently large to accommodate the drive assembly 33.

The rotation of print roller 107, in combination with motion of the thermal ribbon TR creates what is termed a nip, i.e. a converging of two rotating surfaces that pulls a sheet, in this case an envelope, through a mailing apparatus. The nip 380 between the print roller 107 and the thermal print head 19 is commonly referred to as a workstation or print station, where actual printing of a postal indicia on the envelope 25 is performed. The nip between the ejection roller 113 and the backing roller 31 is commonly referred to as the exit of the thermal meter 11. The eject roller 113 is located downstream from the print head 19.

Figure 2:
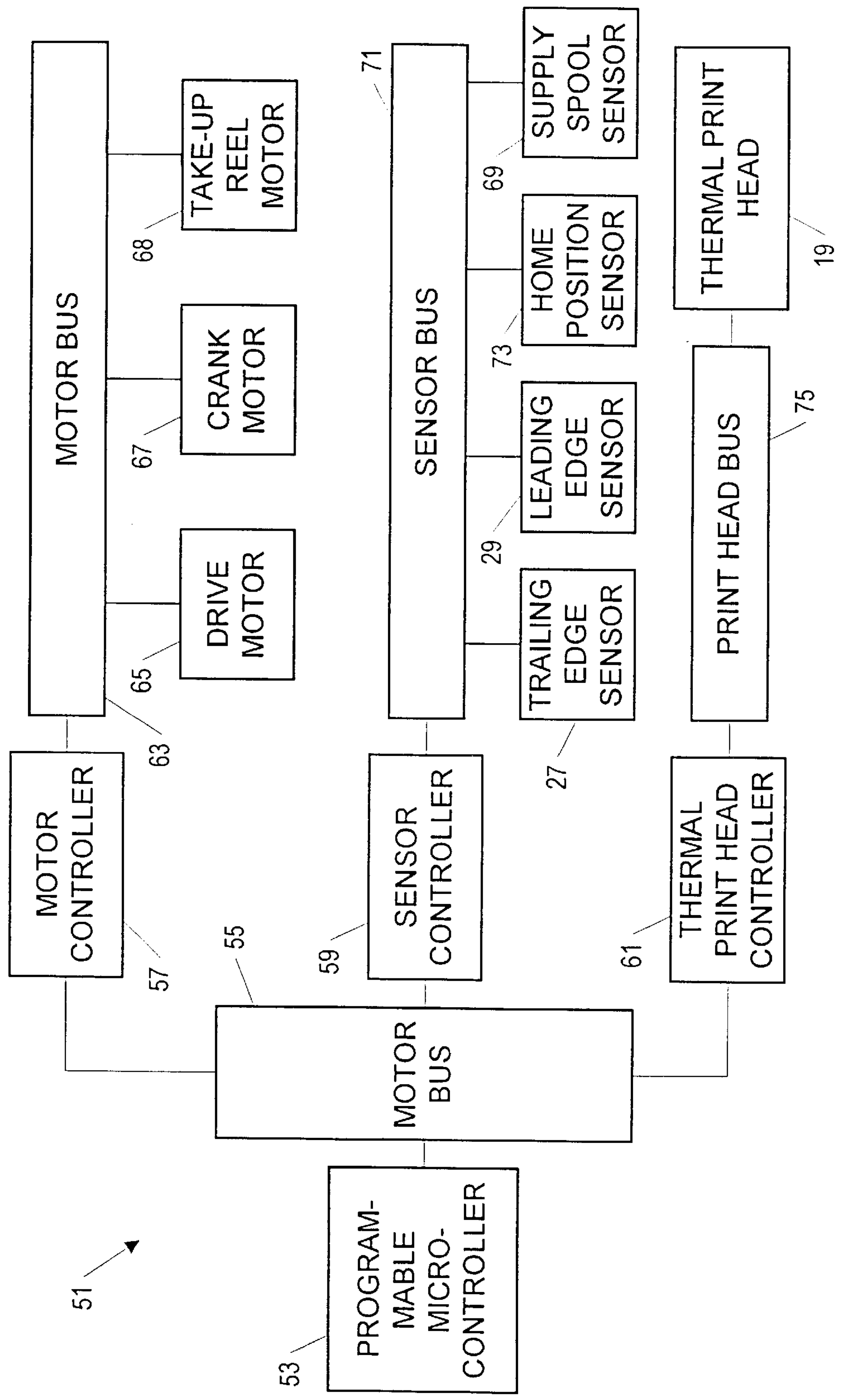
FIG. 2 is a schematic of a micro controller.

Referring now to both FIGS. 1 and 2, the thermal meter 11 is governed by the control system 51. The control system 51 includes a programmable micro-controller 53 of any suitable conventional design, which uses a bus 55 to communicate with a motor controller 57, a sensor controller 59, and a thermal print head controller 61. The motor controller 57, sensor controller 59, and thermal print head controller 61, are each of any suitable conventional design. The motor controller 57 uses a motor bus 63 to communicate with a drive motor 65, a crank motor 67 and a take-up reel motor 68. The drive motor 65 and crank motor 67 are suitably designed stepper motors. The sensor controller 59 uses a sensor bus 71 to communicate with the trailing edge sensor 27, the leading edge sensor 29, a home position sensor 73, and a supply reel sensor 69. The thermal print head controller 61 uses a thermal print head bus 75 to communicate with the thermal print head 19. The trailing edge sensor 27, leading edge sensor 29, home position sensor 73 and supply reel sensor 69 are suitably designed optical sensors. The trailing edge sensor 27 is located a known distance upstream from the ejection roller 113.

Figure 3:
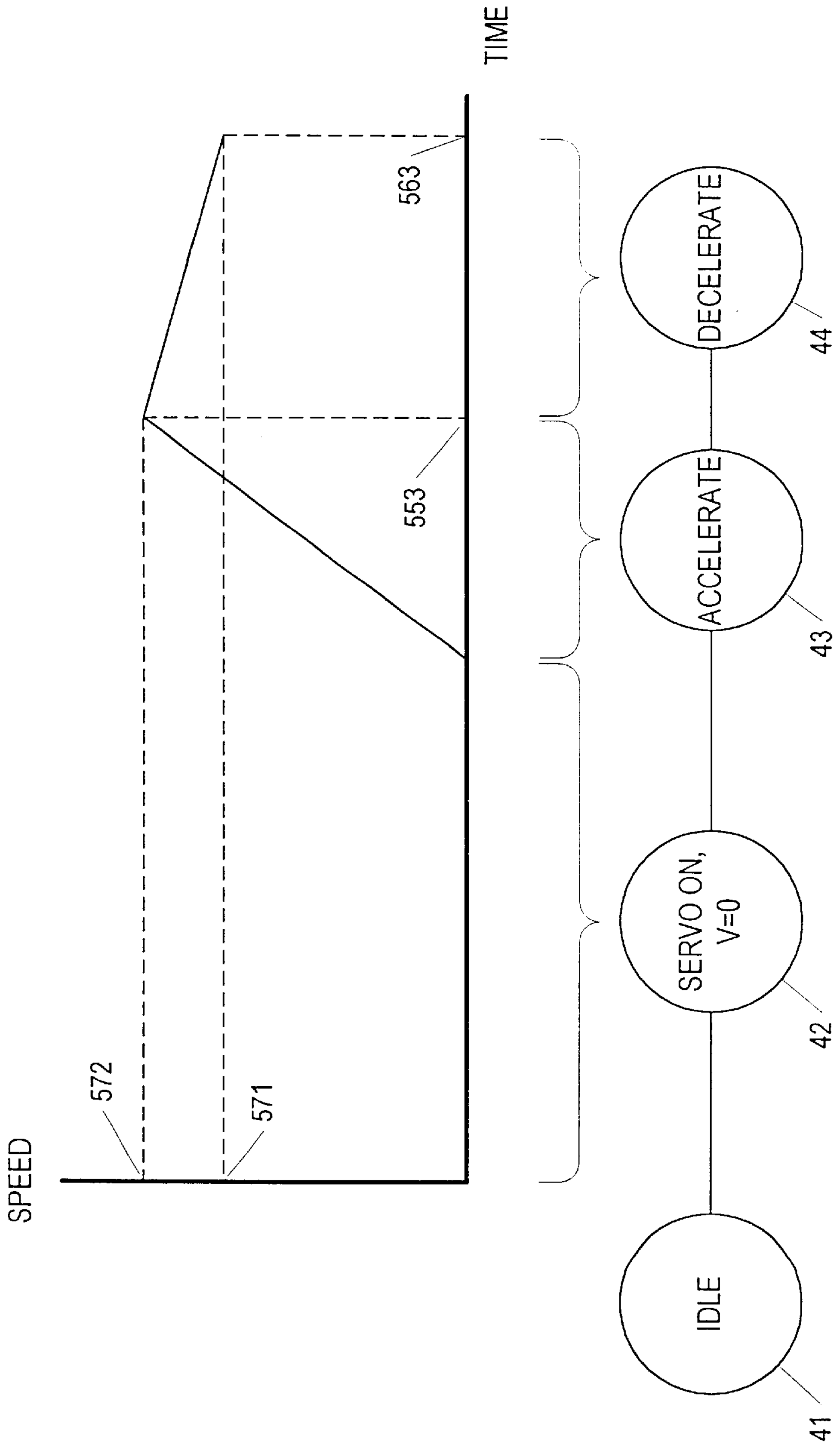
FIG. 3 is a diagram of an envelope injection speed versus time profile where an envelope is continuously accelerated until the trailing edge of the envelope is detected and then decelerated at a calculated rate, shown in relationship to a state diagram.

Referring now to FIG. 3, a speed versus time profile having segments 541–544, or motion profile, is shown along with a corresponding state diagram having states 41–44, the motion profile for controlling the motion of an envelope through the thermal postage meter 11, by providing commands to its motors. According to the motion profile, the envelope 25 is accelerated until the trailing edge sensor 27 senses the trailing edge 26. Therefore, the length of the envelope is a factor that determines the peak speed of the envelope 25 in its progress through the thermal postage meter 11, the peak speed being achieved simultaneous with the trailing edge sensor 27 detecting the trailing edge 26.

Referring again to FIGS. 1 and 2, the leading edge sensor 29 and the trailing edge sensor 27 are suitably positioned relative to the deck 15 so as to detect the presence of the envelope 25. The leading edge sensor 29 is positioned downstream from the print roller 107, in the direction of envelope travel "A", but upstream from the drive shaft 101. The leading edge sensor 29 indicates to the micro-controller 53 when a leading edge 24 of the envelope 25 blocks the leading edge sensor 29. The trailing edge sensor 27 is positioned upstream from the print roller 107. The trailing edge sensor 27 indicates to the micro controller 53 when a trailing edge 26 of the envelope 25 is detected.

The detecting of trailing edge 26 is an example of an "event" in the progress of the envelope 25 through the thermal postage meter 11, and on the occurrence of this event 553, the micro-controller 53, using the peak speed and the known distance from the trailing edge sensor 27 to the ejection roller 113, sends command signals to the motors of the thermal postage meter so as to provide a constant deceleration, according to the motion profile, thereby providing that as the trailing edge 26 of the envelope 25 exits the thermal postage meter, the envelope is at a desired speed 571. The desired speed is selected based on various factors and objectives, including avoiding collisions, ensuring proper stacking of the envelopes in a later stacking device (not shown), reducing unwanted bounce-back, and reducing unwanted noise. Other factors include the weight of the envelope. It is therefore important that a motion profile be tailored to each kind of envelope and each configuration of the thermal postage meter with respect to any follow-on stacker.

The drive assembly 33 includes the drive shaft 101, which is rotatively mounted to extend between the registration wall 17 and deck recess 23. The drive shaft 101 is located below and parallel to the deck 15. Additionally, the drive shaft 101 is aligned to be transverse to the direction of envelope travel "A". Rotatively mounted to the drive shaft 101 is a drive housing 103, which is a generally U-shaped bracket with suitable frame work for attaching various shafts, springs and gears. The deck recess 23 is sufficiently large and free from obstructions to allow the drive housing 103 to rotate or pivot freely about the drive shaft 101. Rotatively mounted to the drive housing 103 is a print roller shaft 105 and an eject roller shaft 111. Fixably mounted to the print roller shaft 105 is the print roller 107 and a print roller gear 109. Fixably mounted to the eject roller shaft 111 is the eject roller 113 and an eject roller gear 115.

It should now be apparent that drive housing 103 behaves in a seesaw-like fashion, pivoting about the drive shaft 101 with the print roller 107 on one end of the drive housing 103, and the eject roller 113 on the other end of the drive housing 103. The drive motor 65 is connected to the print roller 107 and the eject roller 113 by a print roller gear train and an eject roller gear train, respectively. Thus, the drive motor 65 rotates both the print roller 107 and the eject roller 113.

What is not shown is a crank assembly generally located in the deck recess 23 and below the drive assembly 33. The crank assembly is under the control of micro-controller 53 and is primarily responsible from repositioning the drive housing 103 between the home, print and eject positions.

The thermal postage meter 11 remains at idle, with the drive assembly 33 and the crank assembly 201 in the home position, until the operator or the envelope feed system advances the envelope 25 sufficiently along the deck 15 so that the leading edge 24 of envelope 25 is detected by the leading edge sensor 29. What is of interest for illustrating the present invention concerns only what happens to the envelope as it is ejected from the thermal print meter.

As the drive housing 103 enters the eject position, after the envelope is imprinted with postal indicia and whatever other information is to be printed, the micro-controller 53 stops the drive motor 65 from rotating, and instructs the crank motor 67 to reposition the drive housing 103 from the print position to the eject position. While the drive housing 103 is being repositioned, the envelope 25 remains stationary on the deck 15 in the print station. As the drive housing 103 enters the eject position, the ejection roller 113 compresses the envelope 25 against the backing roller 31. Then the micro-controller 53 instructs the drive motor 65 to rotate, which in turn causes the eject roller 113 to rotate, and thus feed the envelope 25 out of the thermal meter 11. The micro-controller 53 may employ different speed versus time profiles to feed the envelope 25 out of the thermal meter 11. It is the methodology used to generate these speed profiles that is the subject of the present invention.

Referring again to FIG. 3, a state diagram having states 41–44 is shown corresponding to the motion profile having segments 541–544. A state diagram, generally, indicates a series of states of motion of an axis under the control of a motor, and each state corresponds to a segment of a motion profile. In the example at hand, the motion profile having the (speed versus time) segments 541–544, and the corresponding states 41–44 of the state diagram, are associated with the motion of the axis 111 of the eject roller 113, geared to the drive shaft 101, the motion resulting from commands to the drive motor 65 (FIGS. 1 and 2).

Still referring again to FIG. 3, in a first state 41 the motor 65 is idle. In a next state 42, indicated as "Servo On, V=0", power is provided to the windings of the motor 65. In a next state 43, the drive motor is provided with power in such a way as to cause acceleration of axis 111 so that the eject roller 113 rotates with increasing (and later decreasing) speed, and thus feeds the envelope 25 out of the thermal meter 11. The envelope 25 is fed out with increasing speed until the trailing edge sensor 27 senses the trailing edge 26 of the envelope 25, prompting a commands to the motor 65 to cause the axis 111 to enter a state 44 of deceleration.

Figure 4:
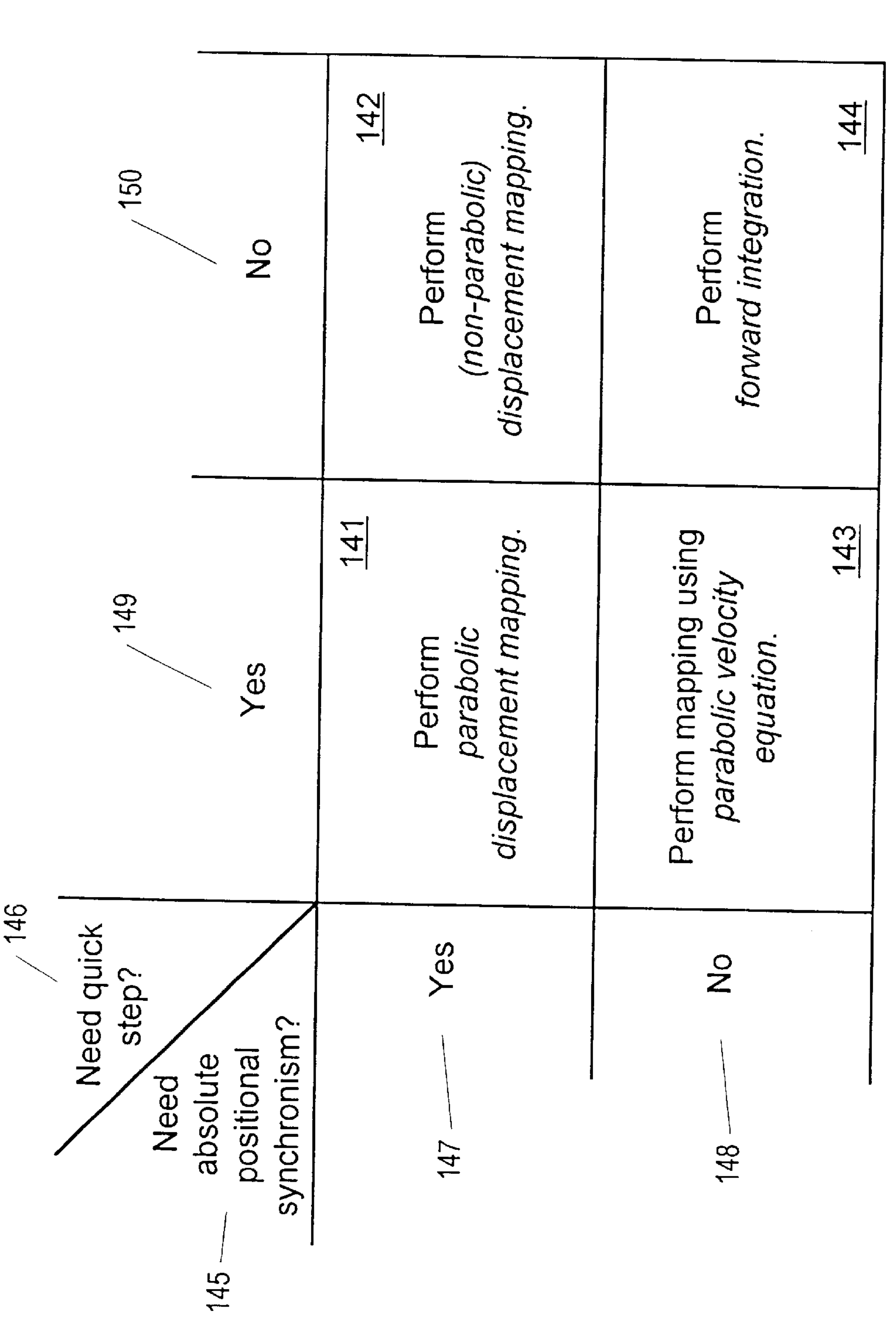
FIG. 4 is a table indicating a methodology for motion profile generation, according to the present invention.

Referring now to FIG. 4, the methodology of the present invention, by which a motion profile is to be provided, is shown as including four processes 141–144 by which to determine a segment of a motion profile, one or another of the processes 141–144 to be used depending on the answers "Yes" 149 or "No" 150 to a first query 146, "Need a quick step?"; and also depending on the answers "Yes" 147 or "No" 148 to a second query 145, "Need absolute positional synchronism?" A quick step is a transition segment, as described above. Absolute positional synchronism of an axis is the synchronized motion of the axis with respect to the motion of some other axis.

Still referring to FIG. 4, a process 141 of parabolic displacement mapping is performed when a quick step is needed, and absolute positional synchronism is also needed. In the case where absolute positional synchronism is still needed, but a quick step is not needed, the methodology calls for a process 142 performing displacement mapping. In case that a quick step is still needed, but absolute positional synchronism is not needed, the methodology calls for performing a process 143 of mapping using a parabolic velocity equation. In case that a quick step is not needed, nor is absolute positional synchronism needed, the methodology calls for performing a process 144 of forward integration. Each of the processes 141–144 will now be described in turn.

Figure 5:
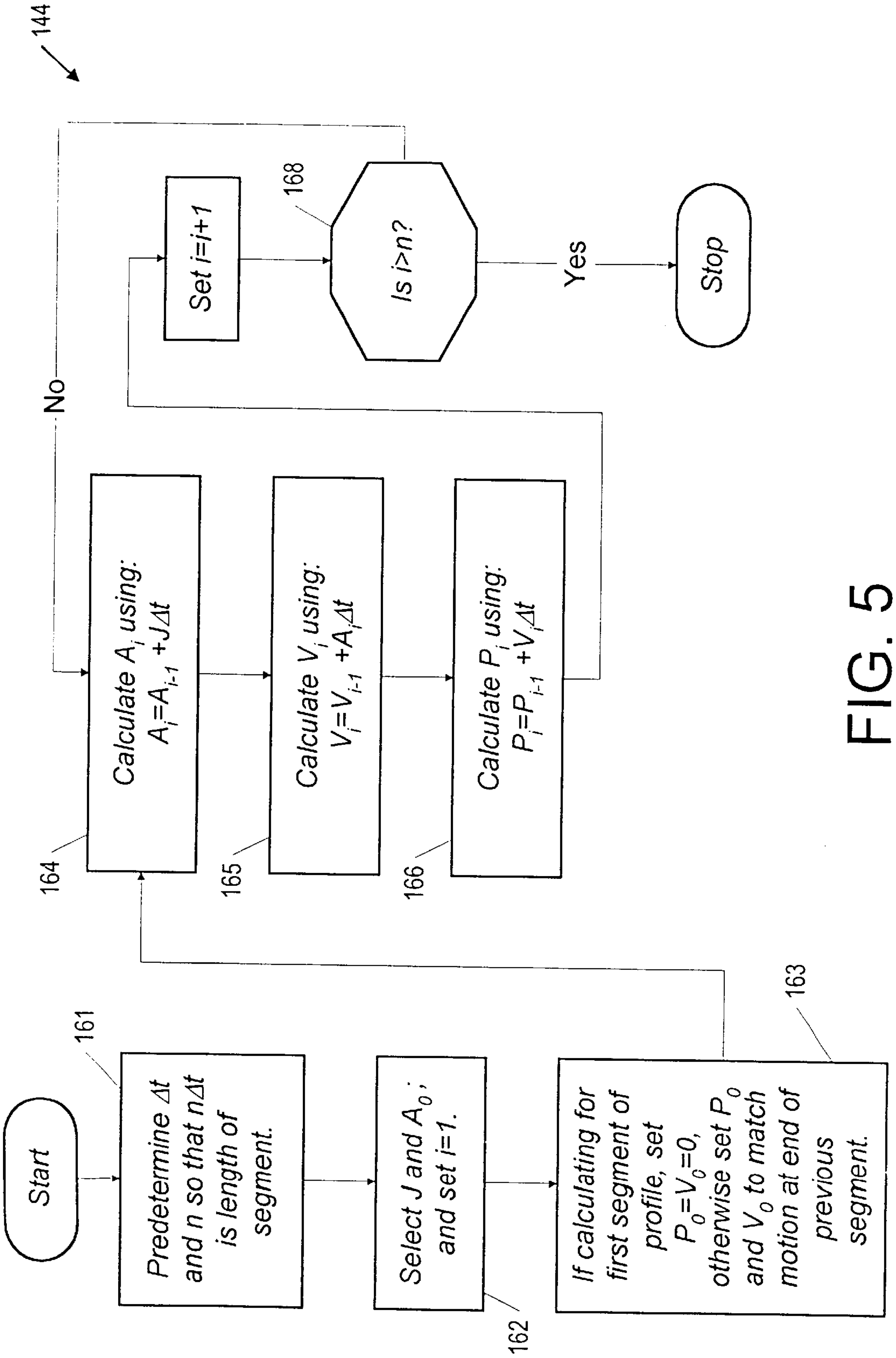
FIG. 5 is a flow chart indicating motion profile generation, for a segment of a motion profile, according to forward integration.

Referring now to FIG. 5, the process 144 of performing forward integration to generate a segment of a motion profile is shown as including a first step 161 of predetermining a time increment Δt and a number n of such time increments so that nΔt is the length of the segment for which the process of forward integration is to be performed. In a next step 162, a value of so-called jerk, i.e. acceleration per unit time, and also starting acceleration are selected, and a counter i is initialized. The value of jerk and starting acceleration are inputs to the process. Only one value of jerk is used throughout a segment, and if it is zero, the acceleration does not change from its starting value.

In a next step 163, the initial position and velocity are set to zero in the case that the segment is a first segment in a motion profile. Otherwise, the initial position and velocity for the segment are selected to match the motion at the end of the previous segment. It is also possible for other starting values of position of velocity to be used for a segment.

In a next step 164, the acceleration is calculated for each new interval of time Δt, based on the acceleration from the previous interval and based on the constant value of jerk. In a next step 165, each new acceleration is used to calculate the velocity for each new time interval, also using as an input the velocity from the previous time interval. In a next step 166, the position is calculated for each new interval time, using as input the velocity for that interval time and the position from the previous interval time. Then, in a next step 167, the counter i is incremented, and in a follow-up step 168, the counter is compared to the number of intervals in the segment, and if the number of intervals so far calculated exceeds the number of intervals in the segment, then the process of generating the segment is stopped.

Figure 9:
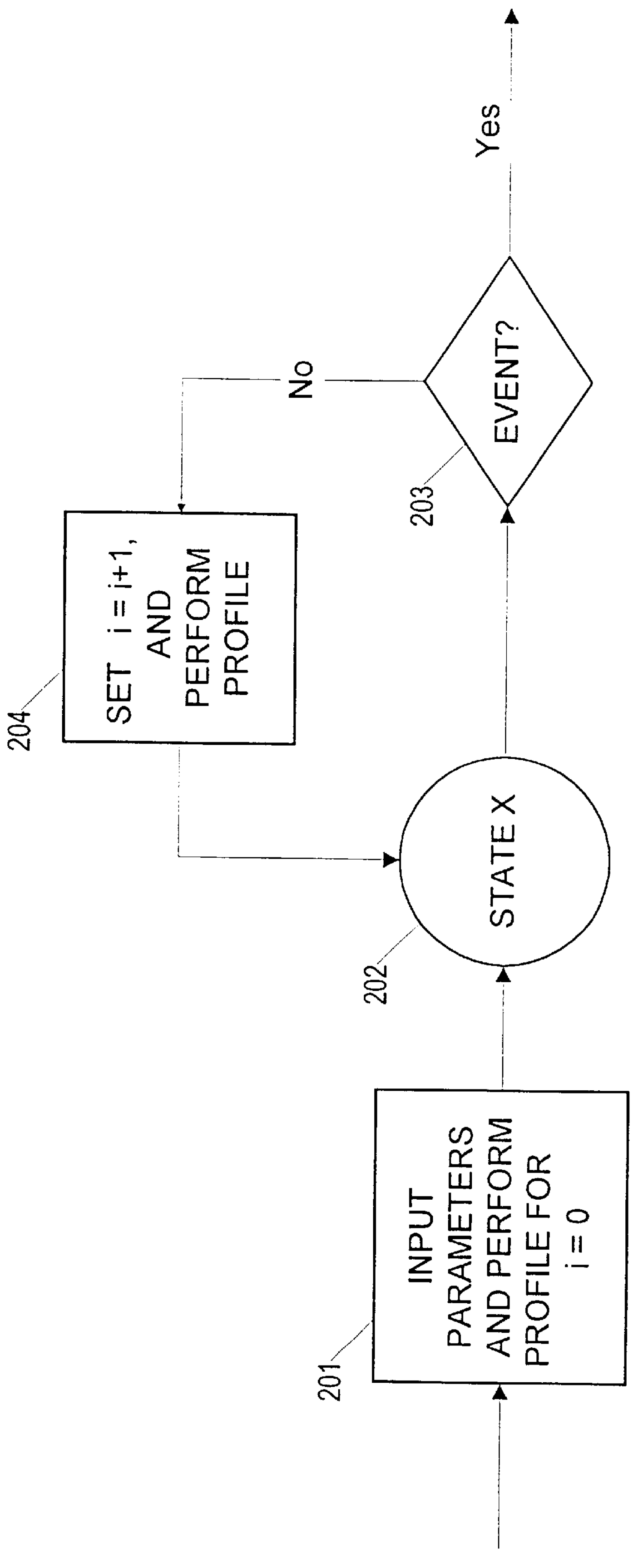
FIG. 9 is a flow diagram indicating how first one segment of a motion profile is generated (generally), and then another.

Referring now to FIG. 9, the overall process of constructing a motion profile, i.e. of constructing each segment of a motion profile, is shown as including a process 201 of inputting parameters (such as starting values of position, velocity and acceleration, and a value to be used for jerk), thereby placing the axis of the motor being controlled (to cause a desired motion of an envelope or sheet) in a state 202 labeled "State X". Next, the overall process checks whether an event has occurred, as indicated in a decision block 203 labeled "Event?". In the process of forward integration, the event of interest is whether a counter has exceeded a predetermined limit, namely the number of intervals in the segment. In some situations, the process continues until, for example, a sensor detects a leading or trailing edge of an envelope or sheet, regardless of the value of a counter. In case the event of interest has not occurred, a process 204 is performing in which the counter is incremented, and the profile is performed, i.e. the speed for a next time interval in the segment of the motion profile is determined, leading again to the decision block 203 checking for the occurrence of the event that would prompt beginning a new segment of a motion profile, or, equivalently, causing another state of motion of the axis whose motion is being controlled.

Figure 6:
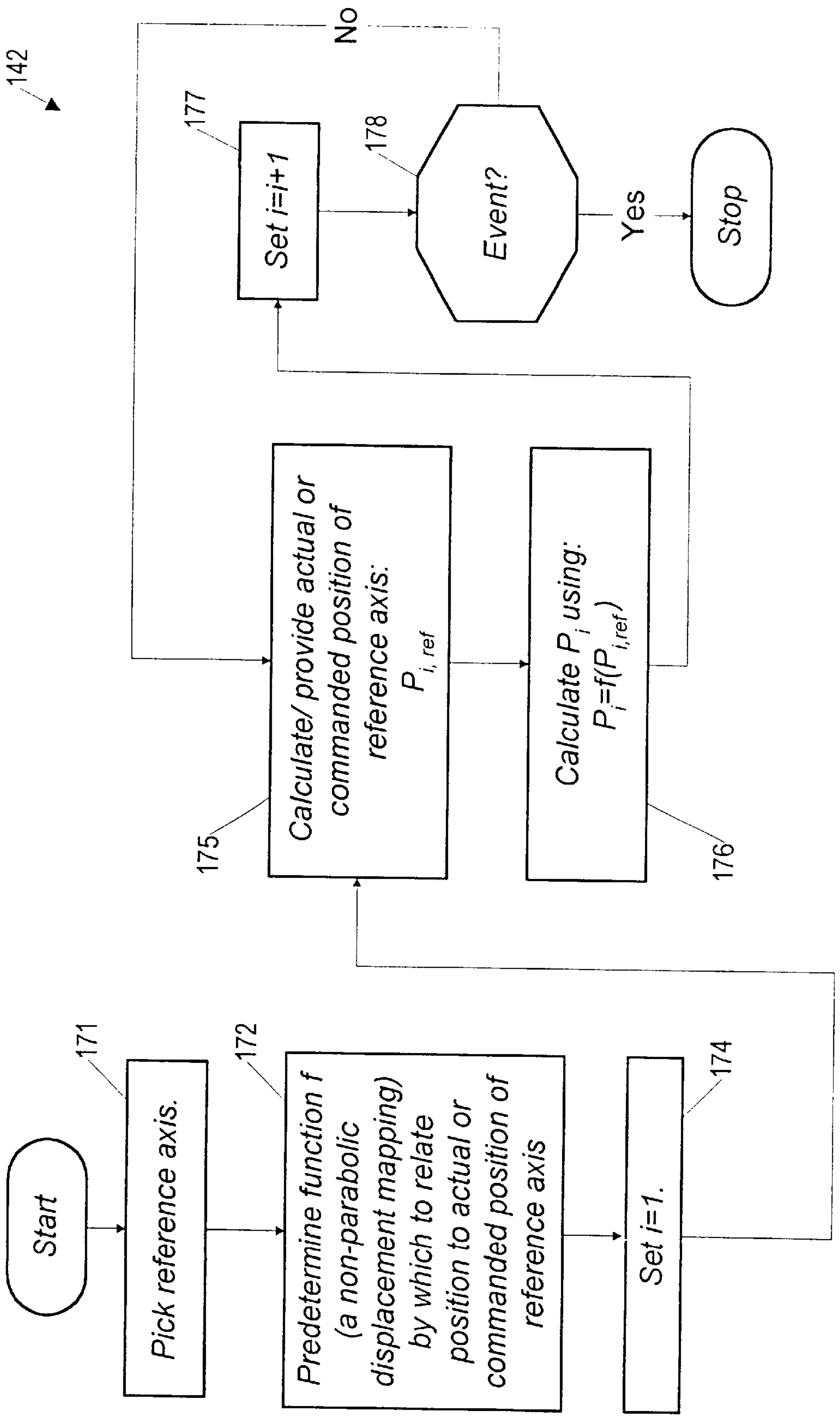
FIG. 6 is a flow chart indicating motion profile generation, for a segment of a motion profile, according to displacement mapping.

Referring now to FIG. 6, the process 142 of performing a displacement mapping is indicated as beginning with a step 171 of picking a reference axis; the objective of this process is to determine the position of the axis to be controlled with respect to the reference axis, and thereby provide absolute positional synchronism. In a next step 172, a function f that accomplishes the displacement mapping is determined; the function/displacement mapping relates the position of the axis to be controlled to the actual or commanded position of the reference axis. If the reference axis has a high inertia or a high friction loading, it is preferable to use actual position so that the displacement relationships between the reference axis and the axis to be controlled are maintained even when the reference axis is not following its commanded profile exactly. If the reference axis has a lower inertia or a lower friction loading and is susceptible to outside disturbances, it is sometimes preferable to use commanded position so that the disturbances are not mapped to the axis to be controlled.

Still referring to FIG. 6, in a next step 174, a counter is initialized. Then in a next step 175, the actual commanded position of the reference axis is provided or calculated; and in a next step 176, the position of the axis to be controlled is calculated based on the actual commanded position of the reference axis, using the predetermined function/displacement mapping f. In the next step 177, the counter is incremented; and in a next step 178, the process 142 determines whether an event has occurred prompting the beginning of a new segment of the motion profile. If not, then the process 142 of calculating the position, based on the displacement mapping, for a new value of the counter is performed, repeatedly, until the event occurs that is the basis for having the axis to be controlled undergo a new motion, indicated as a new state in a state diagram.

Figure 7:
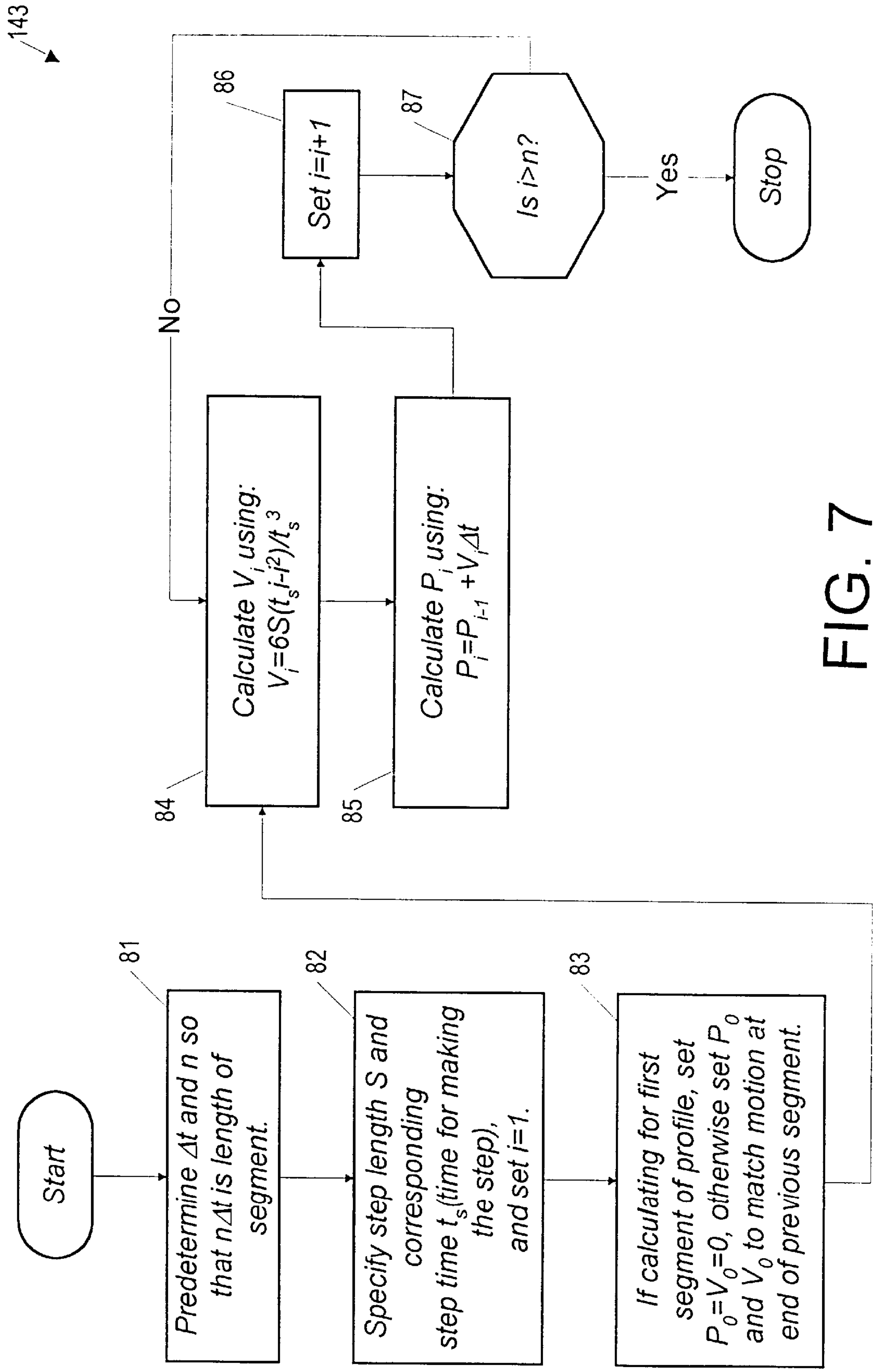
FIG. 7 is a flow chart indicating motion profile generation, for a segment of a motion profile, using a parabolic velocity equation.

Referring now to FIG. 7, the process 143 of providing a segment of a motion profile, as a parabolic velocity curve, is shown to include a first step 81 of predetermining a time interval Δt and number n of time intervals so that nΔt is equal in values to the length of the segment. In a next step 82, a step length S is specified, a corresponding step time (time for making the step) is also specified, and a counter is set to an initial value. In a next step 83, initial values for the position and velocity are set, based on whether the segment of the motion profile is a first segment or a later segment in the motion profile. The position and velocity may be matched to the values of the end of a previous segment, if the current segment is preceded by a previous segment.

In a next step 84, for each subsequent value of the counter, the velocity is determined based on an equation that is parabolic in the counter (the value of the corresponding to a particular time interval). In a next step 85, the position of the axis to be controlled is calculated based on the velocity calculated from the parabolic velocity equation, and based on the position in the previous interval. In a next step 86, the interval is incremented, and in a subsequent step 87, it is compared to the number of intervals in the segment. If the counter has exceeded the number of intervals in the segment, the process is stopped. Otherwise the next velocity is calculated in a step 84, and so on.

Figure 8:
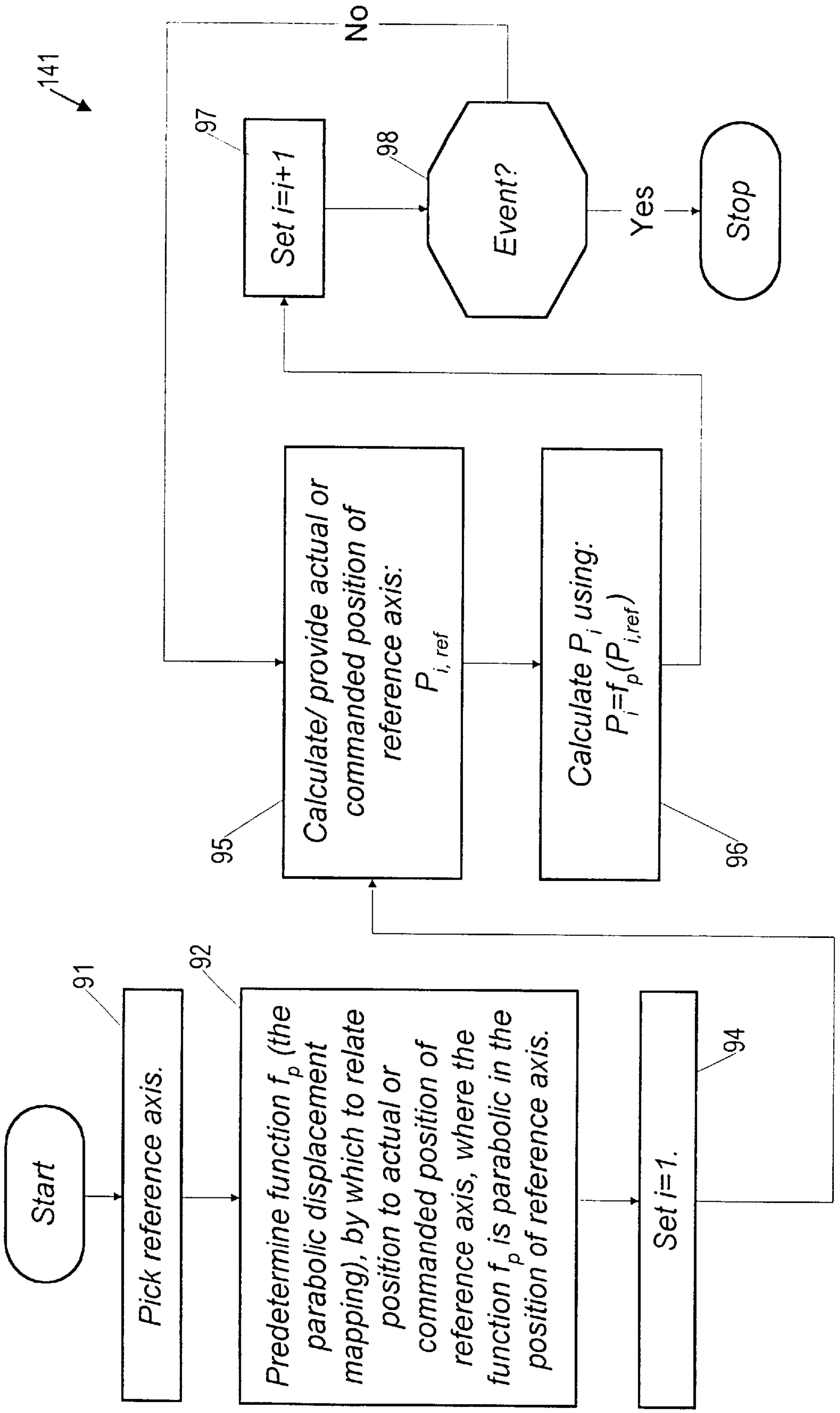
FIG. 8 is a flow chart for motion profile generation, for a segment of a motion profile, using parabolic displacement mapping.

Referring now to FIG. 8, the process 141 of performing a parabolic displacement mapping is shown to include a first step 91 of picking a reference axis, followed by a step 92 of predetermining a displacement mapping (indicated as function $f_p$) that is parabolic in the actual or commanded position of the reference axis, i.e. in the expression for the function, the actual or commanded position occurs raised to the second power, as well as possibly the first power. In a next step 94, a counter is initialized, and for each value of the counter, beginning with the initial value, first the commanded actual position of the reference axis is provided, and then the commanded position of the axis to be controlled is determined, based on the parabolic displacement mapping using as an input the actual or commanded position of the reference axis. In a next step 97, the counter is incremented, and in a next step 98, the process determines whether an event has occurred signaling the end of the segment, and if so, the process 141 of determining the segment of the motion profile is stopped.

It is to be understood that the above described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for creating a motion profile used in controlling motion of an axis of a motor in a mailing machine, the motion profile expressing the motion of the axis in terms of a motion variable having a value depending on time, the motion profile consisting of a finite number of segments, the motion repeating after the motion prescribed in the finite number of segments is performed, the motion prescribed only at predetermined values of time separated by a loop closure period and measured from a starting time corresponding to a trigger event, the method comprising the steps of:

a) if absolute mechanical positional synchronism with respect to motion of another axis is not required and a quick step move is not needed, determining position and velocity after each loop closure period by forward integrating over time from starting values of jerk, acceleration, velocity and position of the axis to be controlled;

b) if absolute mechanical positional synchronism with respect to another axis is required and a quick step move is not needed, determining position after each loop closure period by performing a displacement mapping having an input selected from the group consisting of actual position of a reference axis and commanded position of a reference axis, wherein the displacement mapping is a non-parabolic function of the commanded or actual position of the reference axis;

c) if a quick step is needed and absolute mechanical positional synchronism with respect to motion of another motor is not required, determining position of the axis to be controlled after each loop closure period based on a parabolic velocity equation, having as inputs a step time and a step value, wherein in performing a quick step without regard for absolute mechanical positional synchronism with respect to motion of another axis, the predetermined parabolic equation in time is:

$$V_i = 6S(t_s - t)/t_s^3,$$

where i is a counter restarting from some starting value at the beginning of each segment, where $t_s$ is the step time, and where S is the step value, and further wherein the velocity so calculated is used to determine the position of the axis to be controlled according to the equation:

$$P_i = P_{i-1} + V_i,$$

where $V_i$ is the velocity of the axis to be controlled at the time indicated by the counter i; and d) if a quick step is needed and absolute mechanical positional synchronism with respect to motion of another motor is required, determining position of the axis to be controlled after each loop closure period by a displacement mapping having an input selected from the group consisting of actual position of a reference axis and commanded position of a reference axis, wherein the displacement mapping is a parabolic function of the commanded or actual position of the reference axis.

2. The method of claim 1, wherein the forward integrating is performed, using a counter i restarting from some starting value at the beginning of each segment, according to the equations:

$$P_i = P_{i-1} + V_i, \text{ and}$$

$$V_i = V_{i-1} + A_i,$$

where $P_i$, $V_i$ and $A_i$ are the position, velocity and acceleration, respectively, of the axis to be controlled at the time indicated by the counter i, and where the acceleration of the axis to be controlled is forward integrated according to the equation:

$$A_i = A_{i-1} + J,$$

where J is the jerk of the axis to be controlled, and is constant throughout the segment being generated.

* * * * *